United States Patent Office 3,248,379
Patented Apr. 26, 1966

3,248,379
FIBER REACTIVE DYESTUFFS AND PROCESS FOR THEIR PREPARATION
Lester N. Stanley, Delmar, N.Y., assignor to General Aniline & Film Corporation, New York, N.Y., a corporation of Delaware
No Drawing. Filed Nov. 21, 1962, Ser. No. 239,319
7 Claims. (Cl. 260—199)

This invention relates to a novel fiber-coloring process, and to a novel group of chromophoric compounds useful in such process.

A number of dyeing processes are known in which dyeings of improved fastness properties are obtained by reaction between the dyestuff and the fiber. Among the large number of types of reactive dyes proposed for use in such processes, only a few are commercially useful. These are the cyanuric, the pyrimidine, and the vinylsulfone or sulfatoethylsulfone types. Because of the relative scarcity of such dyestuffs and/or their substantial unavailability to large sections of the dyeing trade and/or various disadvantages inherent in their use with respect to procedure, cost, and/or results obtained, there exists a definite need in the industry for new and improved types of reactive dyestuffs and/or methods of dyeing therewith.

It is an object of this invention to provide a novel process for coloring fibers and other articles in any desired shades of improved fastness properties. Another object of this invention is the provision of a novel group of chromophoric compounds, and intermediates therefor, useful in such process. Still another object of this invention is the provision of methods for making such chromophoric compounds and intermediates. A further object of this invention is the provision of novel colored fibers. A still further object of this invention is the provision of such processes, compounds, intermediates, and colored products, which will not be subject to one or more of the above disadvantages and which depend upon a reaction between the chromophoric compound and the fibers. Other objects and advantages will appear as the description proceeds.

The attainment of the above objects is made possible by this invention which is based upon the discovery that colored fibers with improved properties with respect to fastness to wet treatments, alkaline and acid conditions, laundry sours, and the like can be obtained by treating fibers containing a reactive hydrogen atom with an aqueous medium containing an acidic catalyst and a water soluble chromophoric compound containing at least one fiber-reactive group of the formula

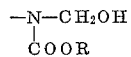

wherein R represents an inert organic radical joined through a carbon atom thereof to the remainder of said group, and subjecting the treated fibers to an elevated temperature for a time sufficient to react said chromophoric compound with said fibers without destroying the fiber structure.

My invention accordingly not only resides in the provision of the foregoing process and the colored fibers resulting therefrom, but also in the provision of the chromophoric compounds useful in such process and methods for making such chromophoric compounds, and intermediates from which such chromophoric compounds are obtained.

The fiber-reactive group shown in the above formula has been found to be exceedingly effective in enabling reaction of water soluble chromophoric compounds containing the same with fibers containing a reactive hydrogen atom in the fiber molecule with liberation of $H_2O$. As the chromophoric compound into which such fiber-reactive group or groups may be inserted in accordance with this invention there may be employed any water soluble known organic dyestuff. Such dyestuffs are generally of aromatic character in containing at least one carbocyclic or heterocyclic ring, as for example azo, quinoid, anthraquinone, indigoid, thioindigoid, di- and triarylmethane, nitro, xanthone, acridine, azine including oxazine and thiazine, cyanine including phthalocyanine, methine, and sulphur dyestuffs. Venkataraman's "Chemistry of Synthetic Dyes," Academic Press, New York, 1952, volumes I and II, discloses a multitude of such organic dyestuffs which are water soluble, as by reason of the presence of one or more ionogenic water solubilizing groups such as sulfonic and carboxylic acid groups, and which contain one or more free amino groups, or into which such solubilizing and free amino groups can be inserted in known manner, which dyestuffs can be further reacted as described below to provide same with one or more fiber-reactive groups of the formula shown above. Further, water soluble free-amino group containing dyestuffs into which fiber-reactive groups may be inserted are also disclosed in, for example, U.S. Patents 2,892,670, 2,892,671, 2,928,711, 2,940,812, 2,978,289, 3,029,123, 3,031,252, and 3,042,477, and such disclosures are incorporated herein by reference thereto.

Optionally, the water soluble chromophoric compounds containing at least one free amino group useful as precursors in making the fiber-reactive chromophoric compounds of the present invention may be colorless compounds containing groups enabling conversion to colored compounds or dyestuffs in situ on the fiber, as for example, a group promoting coupling with a diazotized primary aromatic amine or a diazotizable primary amine group whereby the color may be produced in situ on the fiber after reaction of the fiber-reactive group-containing chromophoric compound with the fiber by suitable development as by, respectively, reaction with a diazotized primary aromatic amine or diazotization and reaction with a coupling component. Other mechanisms and/or groupings are of course known for developing color in situ on the fiber, including metallizing, reducing and/or oxidizing treatments and the like.

It will be understood that in the above described precursor water soluble chromophoric compounds, the free amino group or groups (1, 2, 3, or more such groups) may and preferably are cyclic, but may also be aliphatically bound, for example to an aliphatic carbon atom, the sulfide or sulfonyl group, a carbonyl group, etc.

According to the invention, a water soluble chromophoric compound containing at least one free amino group, as represented by the formula D—$NH_2$, is first reacted with a haloformate of the formula X—COOR, wherein X is halogen including bromine, fluorine, iodine, but preferably chlorine, and R has the values given above, the reaction proceeding according to the following equation:

(I) 

It will be understood that when the precursor chromophoric compound in the above reaction contains more than one free amino group, only one such group need be reacted with a molecularly equivalent proportion of haloformate, although any number of such free amino groups can be reacted in accordance with this equation by employing an amount of haloformate molecularly equivalent to the number of free amino groups desired to be reacted. It will also be understood that when two or more such free amino groups in a precursor chromophoric compound are so reacted, the resulting final fiber-reactive chromophoric compound, containing a plurality of fiber-reactive groups, can enable the attainment of further improved fastness properties in the colored products due to cross-linking between the fibers.

As stated above, R in the fiber-reactive group and in the haloformate reactant represents an inert organic radical joined through a carbon atom thereof to the remainder of the molecule. R is preferably a lower alkyl radical of 1 to 8 carbon atoms such as propyl, butyl, octyl, 2-ethylhexyl, and optimally, methyl or ethyl. R can also be aralkyl such as benzyl, aryl such as phenyl and 4-tolyl, cycloalkyl such as cyclohexyl, and substituted alkyl such as 2-methoxyethyl, 2-ethoxyethyl, 4-methoxy butyl, 2-morpholylethyl, 2-piperidylethyl, 2-dimethylaminoethyl, 2-diethylaminoethyl, and the like. Actually, R is inert so far as the reactions herein are involved, and may accordingly be chain-interrupted or substituted by any inert atoms or radicals. The —COOR group in the haloformate reactant remains unchanged in the intermediate and final reaction products constituting the fiber-reactive chromophoric compounds employed for coloring the fibers, and in the reacted colored fiber, apparently serving as an activating group furthering the reaction between the fiber- and the fiber reactive group-containing chromophoric compound.

The reaction between the haloformate and the precursor free amino containing chromophoric compound is preferably carried out in an aqueous medium containing, if desired, inert solvents such as alcohol and dimethyl formamide, and surface active agents, and preferably a proton acceptor or acid binding agent such as an alkali metal, preferably sodium or potassium, hydroxide, carbonate, bicarbonate, acetate, or phosphate or the like. The reaction medium is held at neutral or preferably alkaline pH, and the reaction is carried to completion, which may take from one to several hours, depending mainly upon the reaction temperature which may vary from the freezing point to the boiling point of the medium. Higher temperatures accelerate the reaction. Following completion of the reaction, the resulting urethane intermediate of the precursor chromophoric compound is precipitated as by cooling and/or salting, filtered and dried if desired.

The intermediate urethane compound resulting from the reaction shown in Equation I above is then reacted with formaldehyde to produce a water soluble chromophoric compound containing the above described fiber-reactive group, in accordance with the following equation:

(II) 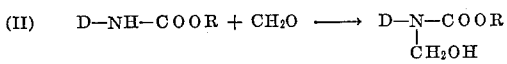

It will be understood that when the urethane intermediate in the above reaction contains more than one urethane group —NH—COOR, only one such group need be reacted with formaldehyde to insert the N-methylol group therein, although it is preferred to react all such urethane groups with a molecularly equivalent amount of formaldehyde. In order to further the reaction, it is preferred to employ in the reaction medium an amount of formaldehyde up to about 25% in excess of theoretical. The fiber-reactive chromophoric compound produced in accordance with the above Equation II may be referred to as an N-methylol urethane derivative.

The reaction illustrated in Equation II can be carried out in substance or in situ on the fiber. When carried out in substance, the reaction is desirably carried out under alkaline conditions, preferably about 8 to 12 and optimally about 9 to 10.5, although any other pH, neutral or acid, can also be employed. The reaction temperature is also not critical and may range from the freezing point to close to the boiling point of the medium and/or the reactants therein. However, since reaction at room temperature may require from several hours to a day or two for completion, it is preferred to employ elevated temperatures, for example from about 40 to 60° C., whereby the desired N-methylol urethane derivative is produced in about 1 to 4 hours.

The desired alkalinity of the reaction medium can be maintained by addition of the known alkaline-reacting compounds such as for example the acid binding substance referred to above with respect to the reaction of the haloformate with the free amino-containing chromophoric compound. Following the completion of the reaction illustrated in Equation II, the alkalinity is preferably reduced to substantial neutrality to prevent undue inhibition of the acidic catalyst subsequently employed in the reaction between the resulting fiber-reactive chromophoric compound and the fiber. This is readily accomplished by addition of the requisite amount of inorganic or organic acid such as hydrochloric, acetic, lactic, citric, tartaric, oxalic acid or the like.

The N-methylol urethane product of the reaction illustrated in Equation II can be separated from the reaction medium in known manner, as for example by salting, cooling, filtering and the like, or the reaction medium can be directly employed for coloring fibrous material.

As indicated above, the reaction illustrated by Equation II may be carried out in situ on the fiber by employing an aqueous fiber-treating medium containing the urethane derivative resulting from the reaction illustrated in Equation I, the required amount of formaldehyde, and an acidic catalyst favoring reaction between the N-methylol urethane derivative and the fiber. It is probable, the formaldehyde reacts preferentially with the imino group in the urethane product of Equation I rather than with the fiber, and may therefore be added to an aqueous medium containing the urethane derivative, acidic catalyst, and fibrous material. It is preferred however to first prepare the aqueous medium containing the urethane derivative and formaldehyde prior to application thereof to the fiber. The acidic catalyst may of course be added to the fiber-treating medium at any time, e.g., before or after application of the medium to the fiber or before or after addition of the urethane intermediate or formaldehyde, or the N-methylol urethane reaction product thereof.

The fiber-reactive chromophoric compounds of this invention are highly effective for coloring natural and synthetic fibers, particularly cellulosic textile fibers in any desired shades of good to excellent fastness properties. The coloring process involves dyeing or printing the fibrous material by application thereto of an aqueous medium containing the defined fiber-reactive chromophoric compound, or the corresponding urethane intermediate and formaldehyde reactants, to the fiber in the presence of an acidic catalyst at any temperature ranging from ambient temperatures to the boiling point of the medium. The aqueous medium is preferably a true or colloidal solution, but may also be in the form of a fine dispersion. It will accordingly be understood that the term "water soluble" as applied to the fiber-reactive chromophoric compound or its precursors is also intended to include ready dispersibility, particularly since most dyestuffs of high molecular weight have limited water solubility and are applied at relatively low concentrations to the fiber.

The fiber-treating medium will generally be applied at a pH close to neutrality although the pH may be varied depending upon the acidic catalyst employed, the fiber being treated, and the like. Thus, dyeing of cellulose fibers is favored by a neutral to alkaline pH whereas dyeing of nitrogeneous fibers is favored by a neutral to acidic pH. The fiber-treating medium may be applied in any desired manner, by continuous or batch methods and by immersion, roller application, padding, spraying, brushing, printing or the like.

The fiber-reactive chromophoric compounds of this invention are applied to the fiber in any desired proportions depending upon the particular compound and fiber, and the depth of shade desired, generally ranging from about 0.5 to 5% based upon the weight of the fiber in the case of overall dyeings. Similarly, for overall dyeing of the fibrous material, the fiber-treating medium will generally contain the fiber-reactive chromophoric compound in a concentration ranging from about 0.5 to 10% or more.

According to the invention, the fiber-treating medium is applied to the fiber in the presence of an acidic catalyst, which latter is preferably added to the medium prior to application to the fiber. Generally, the catalyst is employed in proportions of about 5 to 90% by weight of the fiber-reactive chromophoric compound, and is preferably a polyvalent metal salt of a strong mineral acid, as for example the zinc, magnesium, tin, and aluminum salts of nitric, hydrochloric, sulfuric, phosphoric, and fluoroboric acids. Other acidic catalysts known to favor reactions involving methylol compounds may however also be employed as for example acetic, lactic, citric, tartaric, and oxalic acids, ammonium sulfate, chloride, fluoroborate, and thiocyanate, sodium and potassium alum and acid sulfate, dimethyloxalate, ethyl acid phosphate, and various commercially available amine and alkanolamine hydrochloride catalysts and accelerators.

In the fiber-treating medium employed in the present invention, the water may be replaced in part by a swelling agent or water miscible, polar organic solvent such as acetone, alcohol, dioxane, dimethylformamide, or the like. Further, the medium may contain adjuvants commonly used in dyeing processes as for example solution aids such as urea and thiodiglycol, migration inhibitors such as cellulose ethers, sodium chloride, sodium sulfate and other salts, wetting agents preferably of the nonionic surface active type as produced for example by polyoxyethylenation of such reactive hydrogen containing compounds as higher molecular weight alcohols, phenols, fatty acids, and the like, and thickening agents for the production of printing pastes such as methyl cellulose, starch, gum arabic, gum tragacanth, locust bean gum, sodium alginate, synthetic resins, and the like.

In carrying out the coloring process, the speed of reaction between the fiber and the fiber-reactive chromophoric compound will generally vary inversely with the temperature. The fiber, for example in the form of a fabric, may for example be continuously padded with the fiber-treating medium, and then, if desired after a gentle squeezing, may be wound on a roller with alternating sheets of polyethylene film, and/or the entire roll wrapped in a polyethylene package, and the package held at room temperature or slightly higher until completion of the desired reaction between the fiber and the reactive chromophoric compound has taken place. This may require several hours or more. Alternatively, the fiber may be allowed to remain in the fiber-treating medium at room or elevated temperatures up to the boiling point of the medium until the coloring process is completed which may range from 20 minutes or less to several hours or more. Preferably, the fiber is continuously padded with the fiber-treating medium, squeezed to, for example, a 50 to 200% liquor pickup, dried and heated at 90 to 350° C. for an hour or more to 30 seconds or less. A dry heat treatment may be substituted by a steaming or the like if desired.

The process of this invention has been found to be highly effective for dyeing and printing cellulosic fibers of natural or synthetic type, such as cotton, linen, wood, paper, regenerated cellulose and the like in any desired shades of good to excellent fastness properties. As a result of the reactive dyeing process of this invention such dyed or printed cellulose fibers may be ascribed the formula (III) 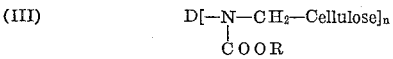

wherein D represents the residue of the water soluble free amino-containing chromophoric precursor compound, R has the values given above, "Cellulose" represents a cellulose molecule deprived of a reactive hydrogen atom as originally present for example in hydroxy groups therein, and $n$ has a value of 1, 2, 3 or more depending upon and corresponding to the number of fiber-reactive groups in the fiber-reactive chromophoric compound being applied. It will be apparent that cross-linking exists, with resultant increased fastness properties, when $n$ has a value of 2 or more.

In addition to cellulose and its derivatives, the process of this invention may be employed for dyeing other fibers containing reactive hydrogen atoms as present for example directly on a carbon, nitrogen or other atom in the linear chain of the fiber polymer, or in a free side group bonded directly or indirectly thereto such as —NRH, —SH, —OH, —CRRH, etc. The resulting dyeings may be ascribed formulae similar to those of the cellulose dyeings described above. As representative of such other fibers, there may be mentioned natural and synthetic proteinaceous fibers such as wool, silk, leather, animal hides and skins, casein, and zein, polyamides such as the 6-, and 6,6-nylons and polypyrrolidone, polyurethanes, polyesters, copolymers or homopolymers containing recurring carboxylic or cyano groups, polyvinyl alcohol, partially hydrolyzed cellulose acetate and polyvinyl acetate, polyvinyl chloride, and mixtures, copolymers and graft copolymers thereof. Mixed fabrics and fibers may likewise be so treated.

The fibers may be in any of the usual forms and in natural bulk, interwoven, knitted or felted form as for example in the form of staple fiber or continuous filaments in bulk form or in the form of two, rope, yarns, slubbings, warps, fabrics, felts, and the like, and treated as a wound package, running length, fibrous stock, bulk, etc. Further, although this invention has been described for use in the coloration of fibrous material, it will be understood that the process may be employed for dyeing other articles including film and sheet material, and other objects of any size, shape and configuration without departing from the spirit and scope of this invention.

The following examples are only representative of the present invention and are not to be regarded as limitative. All parts and proportions referred to herein and in the appended claims are by weight unless otherwise indicated.

*Example 1*

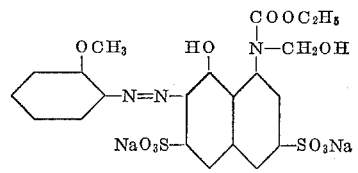

(a) 105 parts of the dyestuff obtained by coupling 1-amino-8-naphthol-3,6-disulfonic acid with diazotized 2-methoxyaniline is dissolved in 3300 parts of water. To this is added 90 parts of ethyl chloroformate portionwise, over a period of 6 hours wherein the pH is adjusted to a pH of approximately 8–8.5 by addition of sodium bicarbonate as required. The solution is heated gradually to 70–75° C. during the addition of the ethyl chloroformate and maintained at that temperature and pH of 8–8.5 for 2 hours. After the reaction has been completed it is salted with 400 parts of salt stirred for 6 hours, iced, filtered, and dried, to obtain the corresponding ethyl urethane intermediate.

(b) 2.4 parts of this material from (a) is dissolved in 100 parts of water to which is then added 5 parts of 40% formaldehyde solution and 1 part of zinc nitrate. Cotton fabric is padded in this solution, excess dyestuff removed and dried at 150° C. for 15 minutes, rinsed and soaped. The fabric is dyed a violet shade.

Boiling for 1 hour in a nonionic detergent solution fails to remove the color, thus demonstrating that reaction has occurred between the fiber and the dyestuff of the above formula.

A similar dyeing made on cotton cloth but eliminating the formaldehyde and catalyst results in a weak dyeing which is almost completely removed by boiling in the nonionic detergent solution for one hour.

*Example 2*

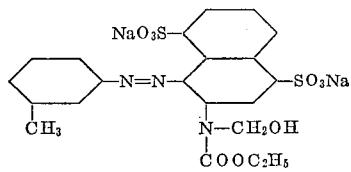

(a) 42 parts of the dyestuff obtained by coupling 2 - naphthylamine - 4,8 - disulfonic acid with diazotized 3-methylaniline is dissolved in 1200 parts of water. To this is added portionwise over a period of 6 hours 40 parts of ethyl chloroformate while maintaining the pH at approximately 8–8.5 by addition of sodium bicarbonate solution as required. The solution is heated gradually to 70–75° C. during the addition of the ethyl chloroformate and maintained at that temperature and at a pH 8–8.5 for 8 hours. It is salted, cooled, filtered, and dried, to obtain the corresponding ethyl urethane intermediate.

(b) 5 parts of this material from (a) is dissolved in 200 parts of water to which is then added 10 parts of 40% formaldehyde solution and 4 parts of zinc nitrate. Cotton is padded in this solution, excess liquid removed, and the cotton is dried in an oven at 200° C. for 5 minutes. The reddish yellow dyeing has fastness properties indicating reaction between the fiber and the dyestuff of the above formula.

*Example 3*

(a) 40 parts of 2-nitro-4′-aminodiphenylamino-3′,4-disulfonic acid disodium salt is dissolved in 1400 parts of water. Portionwise 45 parts of ethyl chloroformate are added over a period of 4 hours. The temperature is gradually raised to 80° C. and maintained for 4 hours. pH is maintained at 8–8.5 throughout by additions of sodium bicarbonate. It is salted, cooled, filtered, and dried to obtain the corresponding ethyl urethane compound.

(b) 6 parts of this material from (a) is dissolved in 100 parts of water to which is then added 13 parts of a 40% formaldehyde solution and 5 parts of magnesium chloride. Cotton fabric is padded in this solution, excess liquid removed, and dry heat applied at 180° C. for 10 minutes. A yellow dyeing is obtained having fastness properties indicating a reaction between the fiber and the N-methylol ethyl urethane derivative of the starting nitro dyestuff.

*Example 4*

To the dyestuff solution of Example 1(b) which contains the urethane of the colored compound, formaldehyde and catalyst, is added gum tragacanth to printing paste consistency. Cotton is printed with this paste and then dried to 175° C. for 10 minutes yielding a purple print having fastness properties like those obtained in Example 1.

*Example 5*

6 parts of the urethane of the colored compound of Example 1(a) are dissolved in 4000 parts of cold water to which is then added 12.5 parts of a 40% formaldehyde solution and 1 part of zinc chloride. 4 parts of 85% formic acid and 100 parts of nylon fabric are added. The nylon is withdrawn, excess liquid removed, and dried at 130° C. for 10 minutes. The fabric is soaped, rinsed and dried. The nylon is colored a purple shade by this reactive dyeing process.

*Example 6*

(a) To a mixture of 64 parts of 1-amino-4-(4′-amino)-anilinoanthraquinone - 2,3′,5 - trisulfonic acid trisodium salt in 1800 parts of water is added 35 parts of methyl chloroformate portionwise over a period of 10 hours. During and after addition the temperature is gradually raised to reflux and maintained under reflux for 6 hours. The pH is maintained at 8–8.5 as usual throughout. It is salted, cooled, filtered, and dried to obtain the corresponding methyl urethane intermediate.

(b) 6 parts of this material from (a) is dissolved in 100 parts of water to which is then added 10 parts of a 40% formaldehyde solution and 2 parts of zinc nitrate. Cotton cloth is padded with this solution, excess lequid squeezed out, and the dyestuff affixed to the fiber by heat treatment at 150° C. for 15 minutes. The fastness properties of the resulting dyeing indicates a reaction between the fiber and the N-methylol methyl urethane of the precursor amino-anthraquinone dyestuff.

*Example 7*

(a) 11 parts of copper phthalocyanine-3-(N-3′-amino-4′-sulfonphenyl)sulfonamide sulfonic acid sodium salt are dissolved in 500 parts of water. To this is added portionwise over a 6 hour period 12 parts of ethyl chloroformate. The temperature is gradually raised to the reflux and maintained for 2 hours. pH is maintained at 8–8.5 as usual throughout. It is salted, cooled, filtered, and dried to obtain the corresponding ethyl urethane intermediate.

(b) 6 parts of this material from (a) is dissolved in 100 parts of water to which is then added 12 parts of 40% formaldehyde solution and 3 parts of zinc nitrate. Cotton fabric is padded in this solution, excess dyestuff removed, dried at 200° C. for 90 seconds, soaped, rinsed and dried. A blue coloration is obtained on the fiber having fastness properties indicating a reaction between the fiber and the N-methylol ethyl urethane of the amino-containing copper phthalocyanine precursor.

*Example 8*

43.3 parts (0.1 mole) of the ethyl urethane intermediate of Example 1(a) are dissolved in 1000 parts of water to which is then added 3.8 parts of formaldehyde (0.125 mole) as at 40% solution. The medium, after adjustment of the pH to 9.5–10 with NaOH, is allowed to stand overnight at room temperature and the pH then reduced to 7–8 with acetic acid, to obtain in the medium the fiber-reactive dyestuff having the formula shown in Example 1.

To the above medium is added 24 parts of magnesium chloride hexahydrate as catalyst, and cotton fabric padded in the resulting medium and cured at 160° C. for 15 minutes. The violet dyeing obtained has fastness properties at least as good as those obtained in Example 1.

This invention has been disclosed with respect to certain preferred embodiments and various modifications and variations thereof will become obvious to the person skilled in the art. It is to be understood that such modifications and variations are to be included within the spirit and scope of this invention.

I claim:

1. A water soluble chromophoric compound of the formula

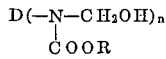

wherein D is the organic residue of an organic water soluble dyestuff selected from the group consisting of azo, anthraquinone, phthalocyanine, and nitro; R is selected from the group consisting of 1 to 8 carbon atom alkyl, cyclohexyl, benzyl, and phenyl radicals joined through a carbon atom thereof to the remainder of the molecule of said compound; and $n$ is an integer of 1 to 3.

2. A chromophoric compound as defined in claim 1 wherein R represents a lower alkyl radical of 1 to 8 carbon atoms.

3. A chromophoric compound as defined in claim 1 of the nitro series.

4. A chromophoric compound as defined in claim 1 of the azo series.

5. A chromophoric compound as defined in claim 1 of the anthraquinone series.

6. A chromophoric compound as defined in claim 1 of the phthalocyanine series.

7. A process comprising reacting, in the presence of an acid binding agent, one molecular proportion of a water soluble azo, anthraquinone, phthalocyanine, or nitro chromophoric compound containing at least one primary amino group with at least one molecular proportion of a haloformate of the formula X—COOR wherein X represents halogen and R represents an organic radical selected from the group consisting of 1 to 8 carbon alkyl, cyclohexyl, benzyl, and phenyl radicals and is joined through a carbon atom thereof to the remainder of the haloformate, and then reacting the resulting intermediate with at least one molecular proportion of formaldehyde, thereby introducing into said chromophoric compound at least one fiber-reactive group of the formula

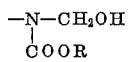

References Cited by the Examiner
UNITED STATES PATENTS

| | | | |
|---|---|---|---|
| 1,886,480 | 11/1932 | Haller et al. | 8—54.2 X |
| 2,332,047 | 10/1943 | Bock et al. | 8—54.2 X |
| 2,339,739 | 1/1944 | Blackshaw et al. | 8—54.2 |
| 2,350,188 | 5/1944 | Pinkney | 8—54.2 |
| 2,623,871 | 12/1952 | Schetty et al. | 260—199 X |
| 2,634,263 | 4/1953 | Steinemann | 260—199 |
| 2,829,142 | 4/1958 | Conzetti et al. | 260—199 |
| 2,904,543 | 9/1959 | Kappeller et al. | 260—199 |
| 2,906,748 | 9/1959 | Riat et al. | 260—199 |
| 2,973,351 | 2/1961 | Montmollin et al. | 260—199 |
| 3,045,005 | 7/1962 | Jung et al. | 260—199 X |
| 3,072,454 | 1/1963 | Long et al. | 260—153 X |

FOREIGN PATENTS

| | | |
|---|---|---|
| 696,589 | 9/1940 | Germany. |
| 842,802 | 7/1960 | Great Britain. |

OTHER REFERENCES

Einhorn, Ann. Der. Chem., volume 361, 1908, page 130.

CHARLES B. PARKER, *Primary Examiner.*

D. G. TORCHIN, *Examiner.*